United States Patent [19]
Poole

[11] Patent Number: 5,342,073
[45] Date of Patent: Aug. 30, 1994

[54] RETRACTABLE STEP FOR MOTOR VEHICLES

[76] Inventor: Ray L. Poole, Rte. 3 Box 364, Florence, S.C. 29505

[21] Appl. No.: 30,663

[22] Filed: Mar. 12, 1993

[51] Int. Cl.$^5$ .............................................. B60R 3/02
[52] U.S. Cl. ..................... 280/166; 105/449; 182/88
[58] Field of Search ................... 280/163, 164.1, 166, 280/169; 105/203, 449; 182/88, 90, 100

[56] References Cited

U.S. PATENT DOCUMENTS

| | | | |
|---|---|---|---|
| 2,145,647 | 1/1939 | Evans | 280/166 X |
| 2,642,217 | 6/1953 | Jennings | 280/166 |
| 3,341,223 | 9/1967 | Wampfler | 280/166 X |
| 3,515,406 | 6/1970 | Endsley, Jr. | 280/166 X |
| 3,671,058 | 6/1972 | Kent | 280/166 |
| 3,743,320 | 7/1973 | Clark | 280/166 |
| 3,915,475 | 10/1975 | Casella et al. | 280/166 |
| 4,108,458 | 8/1978 | Owens | 280/166 |
| 4,140,327 | 2/1979 | Hackney, III | 280/166 |

FOREIGN PATENT DOCUMENTS

| | | | |
|---|---|---|---|
| 561581 | 8/1958 | Canada | 280/166 |
| 1541411 | 2/1979 | United Kingdom | 280/166 |

*Primary Examiner*—Richard M. Camby
*Attorney, Agent, or Firm*—Michael A. Mann

[57] ABSTRACT

A mounted, retractable step for motor vehicles, such as passenger vans, that slides into an extended position for assisting entrance into the side of the passenger van. The step is mounted on the ends of a pair of square rods that slide horizontally under the passenger van. The rods are carried on an outer guide and between a pair of spaced-apart inner guides. The outer guide is attached to a pair of outer guide supports mounted to the edge of the underside of the van. The inner guides are attached to an inner guide support mounted to the underside of the van. Each of the rods has a pair of guide stops, in the form of nipples extending downwardly from the bottom side of the rods, that lock the rods into an extended position and a retracted position depending on which guide they straddle. The step is moved from the retracted position to the extended position by lifting the step slightly and then sliding it out from under the passenger van. This slight lift disengages the outer guide stops from the outer guide, allowing the rods to be slid through the inner guides and over the outer guide. Similarly, to secure the step in the extended position, the step is lifted slightly to cause the inner guide stops to straddle the outer guide. In order to move the step from the extended position to the retracted position, this procedure is reversed.

20 Claims, 2 Drawing Sheets

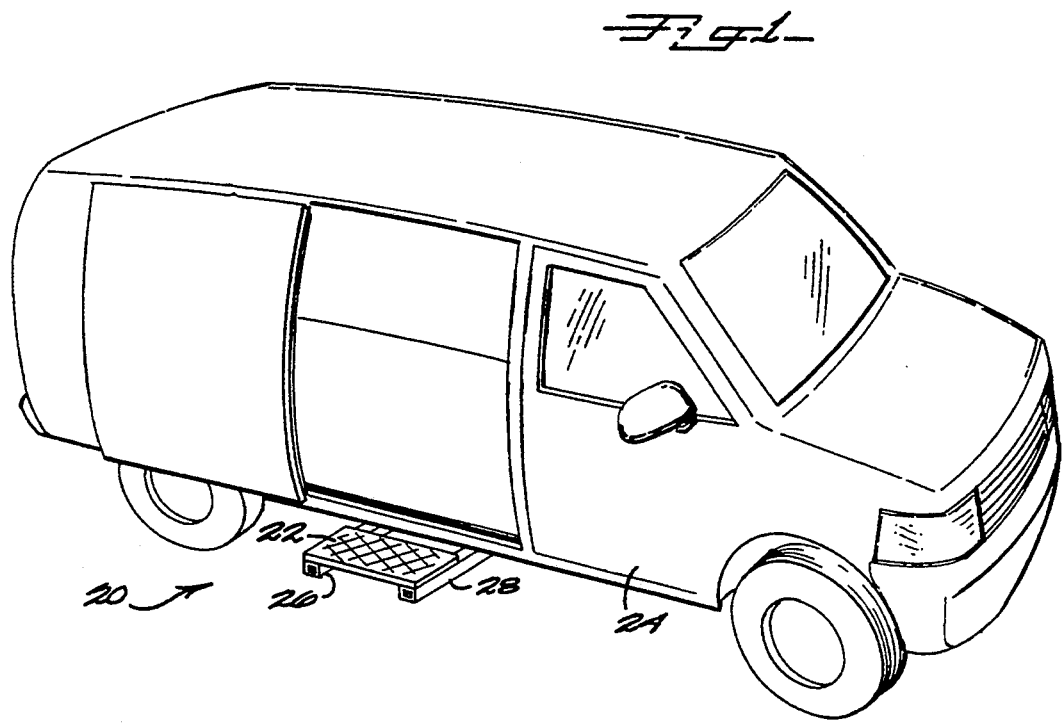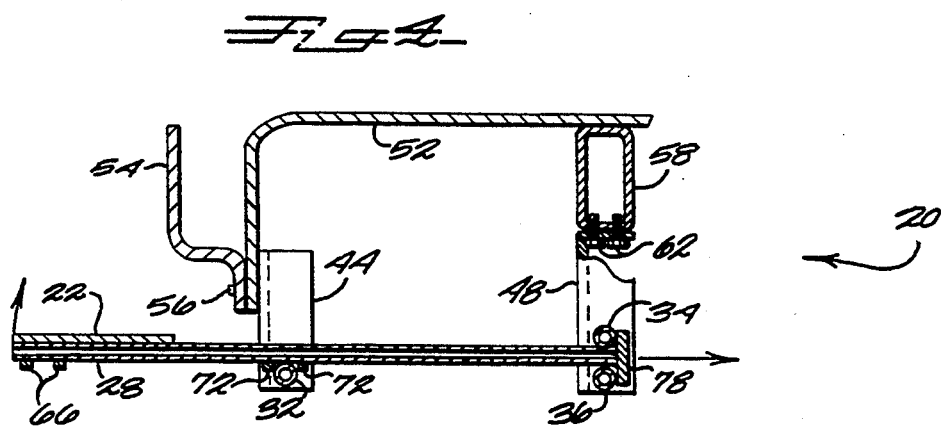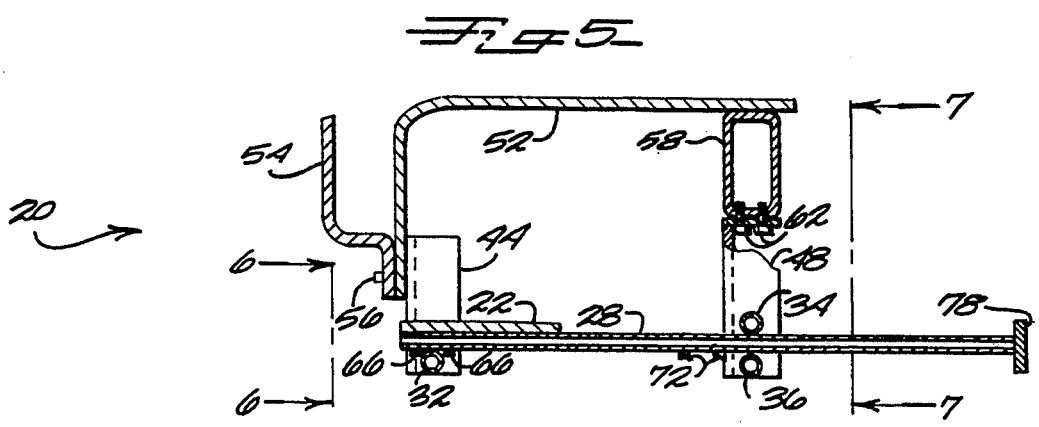

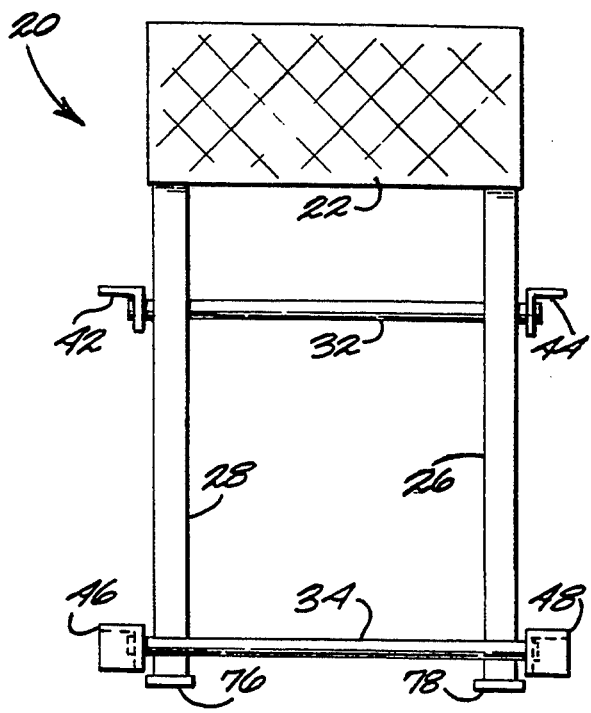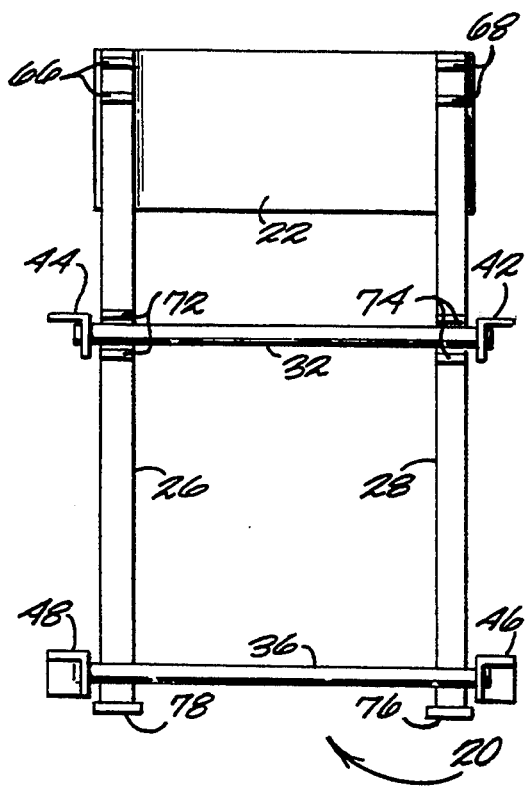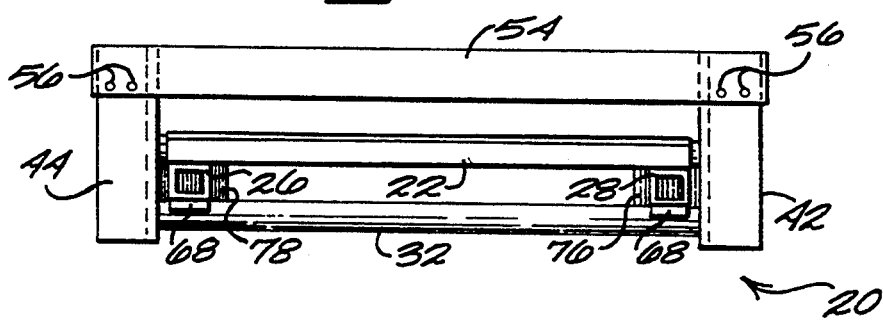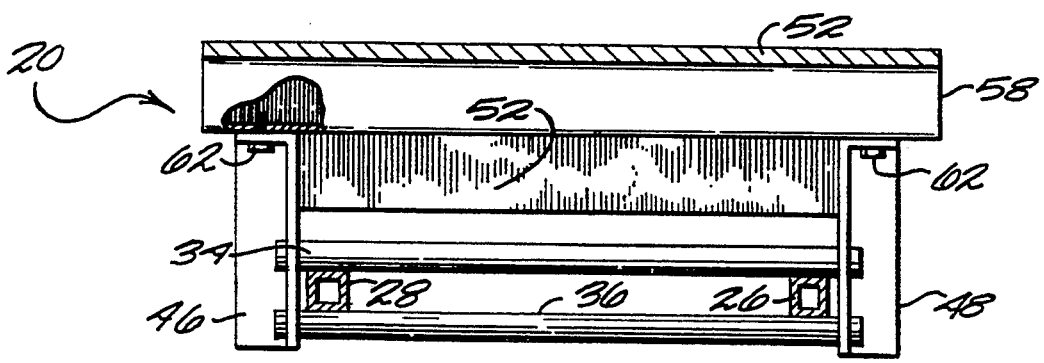

RETRACTABLE STEP FOR MOTOR VEHICLES

BACKGROUND OF THE INVENTION

1. Field of the Invention

The present invention relates to retractable steps for motor vehicles. More particularly, the present invention relates to a step mounted to the underside of a passenger van and that can be pulled out for use and retracted for storage.

2. Discussion of Background

The use of a step or steps, mounted to a motor vehicle, for assisting entrance into the motor vehicle is well known in the art. Moreover, vehicular-mounted steps that retract, either by folding or sliding out of the way when not in use are also known to exist for many types of motor vehicles, especially motor homes and trailers.

For example, U.S. Pat. No. 3,515,406, issued to Endsley, Jr., and U.S. Pat. No. 3,743,320, issued to Clark, both disclose various embodiments of retractable steps preferably for campers that fold out from under the camper bodies. Endsley, Jr. discloses a porch that extends by sliding from underneath a camper. The porch has a step that folds out from a pair of pivoting supports, and a pair of folding legs at either side of the porch that engage the ground to stabilize the porch.

Clark (U.S. Pat. No. 3,743,320) discloses a pair of steps held in spaced relation by a pair of legs. The legs are pivotally connected to the ends of two lateral supports that horizontally extend from a stowage unit located under the camper body. The unit is configured under the camper body so that the step assembly engages the ground for support when extended into operable position.

Evans, in U.S. Pat. No. 2,145,647, discloses a retractable camper step supported by a pair of rods that slide in tubes hung from the frame of the camper by brackets. The step unit has a latch for maintaining the step in its retracted position when not in use.

Also, two foreign patents, GB 1541411, issued to Birch et al, and Canada 561581, issued to Benne, disclose retractable steps that extend out from under various motorized vehicles, preferably motor trucks and trailers. Birch et al feature a retractable, cantilevered step assembly with a spring-loaded plunger that inserts into a corresponding hole along the side of the step supports to maintain either the retracted or extended step position. Benne discloses a retractable, vehicular step that folds out from a pair of supports. The supports hang vertically from a mounting assembly attached to the underside of the vehicle when extended and slide up and back into the mounting assembly when retracted.

Similarly, Wampfler, in U.S. Pat. No. 3,341,223, discloses a retractable safety steps for use in assisting entrance and exit from the back door of a school bus. The steps have textured surfaces and are extended and retracted using rollers. The steps have mechanical stops to limit travel.

Still, the step assemblies discussed above have relatively complex configurations that preclude them from being adapted for easy installation under existing passenger vans. Nothing in the prior art is believed to have a simple, yet effective, construction adaptable for installation under existing passenger vans.

There is a need for a retractable step assembly, having a minimum of elements, that is adaptable for installation on existing passenger vans and similar motor vehicles.

SUMMARY OF THE INVENTION

According to its major aspects and broadly stated, the present invention is a mounted, retractable step for motor vehicles. In particular, it is a step mounted to the underside of a motor vehicle so that it can be slid into an extended position for use. The step is mounted on the ends of a pair of square rods that slide horizontally under the passenger van. The rods are carried on an outer guide attached to an outer guide support attached to the edge of the underside of the van and between a pair of spaced-apart inner guides attached to an inner guide support attached to the underside of the van. Each of the rods has a pair of guide stops in the form of nipples extending downwardly from the bottom side of the rods that lock the rods into an extended position and a retracted position depending on which guide they straddle. The step is moved from the retracted position to the extended position by lifting the step slightly and then sliding it out from under the passenger van. This slight lift disengages the outer guide stops from the outer guide, allowing the rods to be slid through the inner guides and over the outer guide. Similarly, to secure the step in the extended position, the step is lifted slightly to cause the inner guide stops to straddle the outer guide. This procedure is reversed in order to move the step from the retracted position to the extended position.

A major feature of the present invention are the guide supports, and, in particular, the way they are attached and the portion of the vehicle they are attached to, to give support for the step. The inner guide supports are attached to the frame; the outer guide supports are attached to the portion of the vehicle where the rocker panel meets the floor panel. The supports are attached by screws and bolts. Therefore, it is a relatively easy task to backfit almost any type of vehicle with the present invention and to do so with common tools.

The combination of the stops and the guides is another important feature of the invention. The stops straddle the outer guide to prevent lateral movement of the step while the inner guides prevent them from being dislodged, for example, during vehicular movement.

The use of the guides to cause the step to be cantilevered from the side of the vehicle is another feature of the present invention. Because the step does not depend on ground-engaging legs for support, its operation becomes surface-independent.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a sliding step for motor vehicles according to a preferred embodiment of the present invention;

FIG. 2 is a partial top view of the step of FIG. 1 showing its support rods, cylindrical guides and guide supports;

FIG. 3 is a partial bottom view of the step of FIG. 1 showing its support rods, cylindrical guides, guide supports and guide stops;

FIG. 4 is a side cross-sectional view of the step of FIG. 1 in its extended position;

FIG. 5 is a side cross-sectional view of the step of FIG. 1 in its retracted position;

FIG. 6 is a front view of the step of FIG. 1 taken along the line 6—6 in FIG. 5; and FIG. 7 is a partial rear view of the step of FIG. 1 taken along the line 7—7 in FIG. 5.

DETAILED DESCRIPTION OF A PREFERRED EMBODIMENT

In the following description similar components are referred to by the same reference numeral in order to simplify the understanding of the sequential aspect of the drawings.

Referring now to FIG. 1, the sliding step assembly 20 in its preferred embodiment is a rectangular step 22 for use in assisting entrance into the side of a motor vehicle, preferably a passenger van 24. Step 22 is mounted on the end of a pair of rods 26, 28 that move step 22 between an extended position, as shown, in which step 22 is moved out from under and positioned laterally adjacent to the side of passenger van 24, and a retracted position, in which step 22 moved under and positioned just beneath passenger van 24.

In FIGS. 2–3, a more detailed view of all of the components of sliding step assembly 20 is shown. Rods 26, 28 are provided cantilever support by an outer guide 32 and a pair of inner guides 34, 36 (see also FIGS. 4–5). Outer guide 32 is mounted to and supported by a pair of outer guide supports 42, 44. Similarly, inner guides 34, 36 are supported by a pair of inner guide supports 46, 48.

As shown in FIGS. 4–5, outer guide supports 42, 44 (only support 44 is shown) are secured to a floor panel 52 and a rocker panel 54 of passenger van 24 by bolts 56 (see also FIG. 6), or other securing means. Similarly, inner guide supports 46, 48 are mounted to a frame 58 running along floor panel 52 of passenger van 24. Inner guide supports 46, 48 are mounted to frame 58 by bolts 62 (see also FIG. 7), or other mounting means.

Step 22 is preferably a metal plate having a tread or other non-slip surface. Step 22 can be any appropriate size but is preferably dimensioned to be approximately 20" in width and approximately 10" in depth. Rods 26, 28 may be any suitable shape, but are preferably hollow, 1" square metal tubes with walls ⅛" thick (see especially FIGS. 6–7). Preferably, step 22 is attached to the appropriate end of rods 26, 28 by welding.

Outer guide 32 and inner guides 34, 36 are cylindrical pipes, as shown generally in FIGS. 4–5. Outer guide 32 and inner guides 34, 36 are preferably made of a sturdy metal and are dimensioned to be approximately 1" in diameter.

Each end of outer guide 32 is mounted in outer guide supports 42, 44 in a manner that allows outer guide 32 to rotate freely. Similarly, inner guides 34, 36 are free to rotate within inner guide supports 46, 48. In this manner, rods 26, 28 can move horizontally across outer guide 32 and between inner guides 34, 36 in moving between an extended position (as shown in FIG. 4) and a retracted position (as shown in FIG. 5).

Outer guide supports 42, 44 are preferably L-shaped brackets made of a sturdy material, preferably angle iron. The first face of outer guide supports 42, 44 is dimensioned to receive outer guide 32, as shown in FIGS. 2–3. As previously stated, outer guide 32 is freely rotatable between outer guide supports 42, 44, thus allowing rods 26, 28 to roll somewhat effortlessly over outer guide 32. The second face of outer guide supports 42, 44, which is preferably perpendicular to the respective first face of outer guide supports 42, 44, is mounted to floor panel 52 and rocker panel 54 of passenger van 24 by bolts 56.

Similarly, inner guide supports 46, 48 are 3-faced brackets made of a sturdy material, preferably metal. Each bracket has preferably 2 vertical faces and 1 horizontal face, each face being generally orthogonal to the other 2 faces. One of the two vertical faces of inner guide supports 46, 48 is dimensioned to receive inner guides 34, 36 in a vertically aligned orientation, as shown in FIGS. 4–5, 7. The horizontal faces of inner guide supports 46, 48 are mounted to frame 58 of passenger van 24 by bolts 62. Frame 58 is preferably an existing beam running along floor panel 52 of passenger van 24. Thus, sliding step assembly 20 can be installed easily under most vehicles, including vans such as passenger van 24.

Inner guides 34, 36 are mounted to inner guide supports 46, 48 so that they rotate freely within inner guide supports 46, 48. Also, inner guides 34, 36 are vertically spaced within inner guide supports 46, 48 to receive rods 26, 28, and thus allow rods 26, 28 to roll smoothly between inner guides 34, 36.

Referring to FIG. 3, a pair of outer guide stops 66, 68 are connected to the bottom of rods 26, 28, respectively, near the ends where step 22 is mounted. Similarly, a pair of inner guide stops 72, 74 are connected to the bottom of rods 26, 28, respectively, approximately midway between the ends of rods 26, 28. Outer guide stops 66, 68 and inner guide stops 72, 74 are preferably 7/16th inch square solid metal rods welded to rods 26, 28, respectively, with their long dimensions perpendicular to the long dimensions of rods 26, 28, so that they extend across the width and downwardly from rods 26, 28 by 7/16th inch.

As shown in FIG. 5, outer guide stops 66, 68 (only stop 66 is shown) are spaced apart to straddle outer guide 32 when rods 26, 28 are in the retracted position, that is, when step 22 is positioned beneath passenger van 24 (see also FIG. 6). By engaging both sides of outer guide 32, outer guide stops 66, 68 prevent rods 26, 28 from moving horizontally in either direction. Also, rods 26, 28 are prevented from bouncing or moving vertically by inner guides 34, 36, which rods 26, 28 pass between.

Similarly, as shown in FIG. 4, inner guide stops 72, 74 (only stop 72 is shown) are spaced apart to straddle outer guide 32 when rods 26, 28 are in the extended position (see also FIG. 3), thus preventing rods 26, 28 from moving horizontally in either direction. Also, a pair of endplates 76, 78 preferably welded to the ends of rods 26, 28, respectively (see FIGS. 2–3), further prevent rods 26, 28 from moving horizontally past the extended position, also shown in FIG. 4.

By use of outer guide stops 66, 68, inner guide stops 72, 74 and endplates 76, 78 in the manner described above, rods 26, 28 can move and subsequently secure step 22 in an extended position, thus providing a sturdy and stable means for assisting entrance into passenger van 24. Also, when step 22 is not in use, rods 26, 28 can move and secure step 22 under passenger van 24 in a retracted position.

In use, step 22 is positioned initially in the retracted position, as shown in FIG. 5. When passenger van 24 is in transit, outer guide stops 66, 68 engage outer guide 32 to prevent rods 26, 28 from moving horizontally. Also, the vertical alignment of inner guides 34, 36 limits the vertical movement or bouncing of rods 26, 28 so that outer guide stops 66, 68 do not disengage from outer guide 32.

Once passenger van 24 has reached its desired location, step 22 can be manually extended for use in assisting entrance into the side of passenger van 24. In order to move step 22 from the retracted position, as shown in FIG. 5, to the extended position, as shown in FIG. 4, step 22 must be lifted slightly as it is being pulled outward so that outer guide stops 66, 68 vertically clear outer guide 32. Once rods 26, 28 have been extended far enough so that outer guide stops 66, 68 can no longer engage outer guide 32, step 22 can be lowered so that rods 26, 28 roll smoothly along outer guide 32 and between inner guides 34, 36.

Step 22 and rods 26, 28 are manually extended until inner guide stops 72, 74 approach outer guide 32. Then, step 22 and rods 26, 28 are lifted while being extended slightly so that inner guide stops 72, 74 are positioned over outer guide 32. Step 22 is lowered so that inner guide stops 72, 74 straddle outer guide 32, as shown in FIG. 4, thus locking step 22 in the extended position. Also, endplates 76, 78 engage inner guides 34, 36 for providing additional support against rods 26, 28 extending horizontally past the extended position.

Upon completion of use, step 22 is manually retracted by reversing the previously described movements. That is, step 22 is lifted slightly while being pushed toward passenger van 24 in order to disengage inner guide stops 72, 74 from outer guide 32. Step 22 and rods 26, 28 are lowered onto outer guide 32 and inner guides 34, 36, and slid inward along outer guide 32 and between inner guides 34, 36 until outer guide stops 66, 68 approach outer guide 32. Then, step 22 and rods 26, 28 are lifted slightly, pushed inward to align outer guide stops 66, 68 with outer guide 32, and lowered so that outer guide stops engage outer guide 32. Thus, step 22 is secured in its retracted position, as shown in FIG. 5.

It will be apparent to those skilled in the art that many changes and substitutions can be made to the preferred embodiment herein described without departing from the spirit and scope of the present invention as defined by the appended claims.

What is claimed is:

1. Apparatus for use with a motor vehicle, said apparatus comprising:
   a step;
   at least one rod for carrying said step, said at least one rod moving said step horizontally between a retracted position and an extended position;
   an outer support mounted to said motor vehicle;
   an outer guide carried by said outer support;
   an inner support mounted to said motor vehicle;
   an inner guide carried by said inner support, said at least one rod slidably carried by said outer and inner guides so that said at least one rod moves said step horizontally between said retracted position and said extended position;
   an outer guide stop carried by said at least one rod, said outer guide stop engaging said outer guide when said rod is in said retracted position to prevent said at least one rod from moving said step toward said extended position; and
   inner guide stop carried by said at least one rod, said inner guide stop engaging said outer guide when said at least one rod is in said extended position to prevent said at least one rod from moving said step toward said retracted position.

2. The apparatus as recited in claim 1, wherein said motor vehicle has an underside and wherein said inner support further comprises a pair of plates, each of said plates having a first generally horizontal face mounted to said underside and a second generally vertical face for mounting said inner guide thereto.

3. The apparatus as recited in claim 1, wherein said outer support further comprises a pair of plates, each of said plates having a first generally vertical face mounted to said motor vehicle and a second generally vertical face for mounting said outer guide thereto, said first and second faces being generally perpendicular to each other.

4. The apparatus as recited in claim 1, wherein said outer guide stop engagingly straddles said outer guide when said at least one rod is in said retracted position.

5. The apparatus as recited in claim 1, wherein said inner guide stop engagingly straddles said outer guide when said at least one rod is in said extended position.

6. The apparatus as recited in claim 1, wherein said at least one rod has a top side and a bottom side and wherein said outer guide stop further comprises a pair of nipples mounted on said bottom side and extending vertically downward, said nipples spaced apart to engagingly straddle said outer guide when said at least one rod is in said retracted position.

7. The apparatus as recited in claim 1, wherein said at least one rod has a top side and a bottom side and wherein said inner guide stop further comprises a pair of nipples mounted on said bottom side and extending vertically downward, said nipples spaced apart to engagingly straddle said outer guide when said at least one rod is in said extended position.

8. The apparatus as recited in claim 1, wherein said outer guide is a generally cylindrical member, said member having an axis of rotation generally perpendicular to the direction of movement of said at least one rod, said member rotatable about said axis.

9. The apparatus as recited in claim 1, wherein said inner guide further comprises a pair of generally cylindrical members vertically aligned and in spaced relation to receive said at least one rod therebetween, each of said members having an axis generally perpendicular to the direction of movement of said at least one rod, each of said members rotatable about said axis.

10. The apparatus as recited in claim 1, wherein said at least one rod further comprises two rods spaced apart and generally parallel, each of said rods having a first end, a second end, a top side and a bottom side, said first end of each of said rods having a flat surface on said top side for mounting said step thereon, said outer stop mounted on said bottom side at said first end, said inner stop mounted on said bottom side approximately midway between said first and second ends.

11. The apparatus as recited in claim 1, wherein said rod further comprises a generally vertical endplate mounted on said rod, said endplate being generally perpendicular to said rod and dimensioned to engage said inner support when said rod is in said extended position.

12. Apparatus for use with a motor vehicle, said motor vehicle having an underside with an edge, said apparatus comprising:
   a step;
   two rods in spaced relation and generally parallel for carrying said step, each of said two rods having a first end, a second end, a top side and a bottom side, each of said first ends having a flat surface on said top sides for mounting said step thereon, said two rods moving said step horizontally between a retracted position whereby said rods position said step vertically beneath said underside of said motor vehicle and an extended position whereby said rods position said step laterally adjacent to said motor vehicle;

an outer support mounted to said edge of said underside;

a generally cylindrical outer guide rotatably mounted on said outer support, said outer guide having an axis of rotation generally perpendicular to the direction of movement of said two rods;

an inner support mounted to said underside;

two generally cylindrical inner guides rotatably mounted on said inner support, said inner guides vertically aligned and in spaced relation to receive said two rods therebetween, each of said inner guides having an axis of rotation generally perpendicular to the direction of movement of said two rods, said inner guides slidably carrying said two rods and rotating in opposite directions to move said two rods between said retracted and extended positions;

two outer guide stops mounted on said bottom side at said first end of each of said two rods, said outer guide stops engagingly straddling said outer guide when said two rods are in said retracted position to prevent said rods from moving said step horizontally toward said extended position; and two inner guide stops mounted on said bottom side approximately midway between said first and second ends of each of said two rods, said inner guide stops engagingly straddling said outer guide when said two rods are in said extended position to prevent said rods from moving said step horizontally toward said retracted position.

13. The apparatus as recited in claim 12, wherein said inner support further comprises a pair of plates, each of said plates having a first generally horizontal face mounted to said underside and a second generally vertical face for mounting said inner guide thereto.

14. The apparatus as recited in claim 12, wherein said outer support further comprises a pair of plates having a first generally vertical face mounted to said edge of said underside and a second generally vertical face for mounting said outer guide thereto, said first and second faces generally perpendicular to each other.

15. The apparatus as recited in claim 12, wherein each of said outer guide stops further comprises a pair of nipples extending vertically downward from said bottom side of said rods, said nipples spaced apart to engagingly straddle said outer guide when said two rods are in said retracted position.

16. The apparatus as recited in claim 12, wherein each of said inner guide stops further comprises a pair of nipples extending vertically downward from said bottom side of said rods, said nipples spaced apart to engagingly straddle said outer guide when said two rods are in said extended position.

17. The apparatus as recited in claim 12, wherein each of said two rods further comprises a generally vertical endplate mounted at said second end, each of said endplates mounted perpendicular to the movement of said rods, each of said endplates dimensioned to engage said inner support when said two rods are in said extended position, each of said endplates preventing said two rods from moving said step beyond said extended position.

18. Apparatus for use with a motor vehicle, said motor vehicle having an underside with an edge, said apparatus comprising:

a step;

two rods in spaced relation and generally parallel for carrying said step, each of said two rods having a first end, a second end, a top side and a bottom side, each of said first ends having a flat surface on said top side for mounting said step thereon, said two rods moving said step horizontally between a retracted position whereby said rods position said step vertically beneath said underside of said motor vehicle and an extended position whereby said rods position said step laterally adjacent to said motor vehicle;

a pair of outer supports, each of said outer supports having a first generally vertical face mounted to said edge of said underside and a second generally vertical face, said first and second faces of said outer supports generally perpendicular to each other;

a generally cylindrical outer guide rotatably mounted to said second face of said outer support, said outer guide having an axis of rotation generally perpendicular to the direction of movement of said two rods;

a pair of inner supports, each of said inner supports having a first generally horizontal face mounted to said underside and a second generally vertical face;

two generally cylindrical inner guides rotatably mounted to said second face of said inner support, said inner guides vertically aligned and in spaced relation to receive said two rods therebetween, each of said inner guides having an axis of rotation generally perpendicular to the direction of movement of said two rods, said inner guides slidably carrying said two rods and rotating in opposite directions to move said two rods between said retracted and extended positions;

a pair of outer guide stops mounted on said bottom side at said first end of each of said two rods, said outer guide stops engagingly straddling said outer guide when said two rods are in said retracted position to prevent said rods from moving said step horizontally toward said extended position; and a pair of inner guide stops mounted on said bottom side approximately midway between said first and second ends of each of said two rods, said inner guide stops engagingly straddling said outer guide when said two rods are in said extended position to prevent said rods from moving said step horizontally toward said retracted position.

19. The apparatus as recited in claim 18, wherein each of said outer guide stops further comprises a pair of nipples extending vertically downward from each of said bottom sides at said first end of each of said two rods, said nipples spaced apart to engagingly straddle said outer guide when said two rods are in said retracted position whereby said movement of said two rods toward said extended position is prevented.

20. The apparatus as recited in claim 18, wherein each of said inner guide stops further comprises a pair of nipples extending vertically downward from each of said bottom sides midway between each of said first ends and second ends of said two rods, said nipples spaced apart to engagingly straddle said outer guide when said two rods are in said extended position whereby said movement of said two rods toward said retracted position is prevented.

* * * * *